United States Patent [19]
Forsyth et al.

[11] 3,961,349
[45] June 1, 1976

[54] ACCESSORY MOUNTING ADAPTOR FOR PHOTOGRAPHIC APPARATUS

[75] Inventors: Robert P. Forsyth, Carlisle; Gilbert A. Rose, Sr., East Taunton, both of Mass.

[73] Assignee: Polaroid Corporation, Cambridge, Mass.

[22] Filed: Dec. 16, 1974

[21] Appl. No.: 533,328

[52] U.S. Cl. .............................. 354/295; 354/286
[51] Int. Cl.² ........................................ G03B 17/56
[58] Field of Search ................. 354/295, 80, 81, 82, 354/126, 187, 189, 286, 287, 293, 354; 224/50

[56] References Cited
UNITED STATES PATENTS

| | | | |
|---|---|---|---|
| 1,053,400 | 2/1913 | Johnson | 354/81 |
| 3,291,179 | 12/1966 | Lang | 354/293 X |
| 3,747,490 | 7/1973 | Brandt | 354/286 |
| 3,821,771 | 6/1974 | Johnson et al. | 354/293 |

Primary Examiner—L. T. Hix
Assistant Examiner—E. M. O'Connor
Attorney, Agent, or Firm—John W. Ericson

[57] ABSTRACT

An accessory attachment for use with a camera of the type having a frontal generally parallelepiped housing for an objective lens, a shutter mechanism, and camera function-controlling devices such as photocells and shutter or control knobs or buttons. The attachment serves to mount accessories such as auxiliary portrait, wide-angle, or telephoto lenses, filter lenses for the camera's objective lens and photocell, auxiliary shutter or control knobs, and flash equipment, in aligned operative relation to the corresponding elements of the camera. The attachment comprises a housing mounting the accessories in a front portion, and a pair of wing portions extending rearwardly to embrace the side walls of the lens-shutter housing, and bearing a pair of opposed latch portions which releasably engage rear corner portions of the side walls. Locating flanges in the side walls of the lens-shutter housing align the attachment correctly with the camera. A pair of actuating levers may be connected with the latch portions and extended forwardly of the housing into opposed grip portions for manual deflection of the latch portions to disengage the attachment from the camera.

7 Claims, 7 Drawing Figures

ACCESSORY MOUNTING ADAPTOR FOR PHOTOGRAPHIC APPARATUS

BACKGROUND AND BRIEF DESCRIPTION OF THE INVENTION

This invention relates to means for conveniently attaching accessories to cameras, and has special application to cameras of the kind having a frontal housing for mounting such elements as an objective lens, a shutter mechanism, a photographic process-controlling photocell, flash equipment, or related devices.

Cameras of a type in connection with which this invention will be particularly described are disclosed and claimed, inter alia, by U.S. Pat. Nos. 3,714,879 and 3,810,211, which are assigned to the assignee of this application. These patents pertain to compact collapsible cameras of the self-developing type, now well known in the art and in common use, and it is sufficient for purposes of describing the present invention to explain that their lens-shutter housings are of generally parallelepiped form, having a front wall in which an objective lens and camera function-controlling devices are mounted, and side, top, and bottom walls which extend rearwardly to terminate in rear corners, between which a light-tight enclosure, housing film for sequential exposure by the shutter mechanism, adjoins the rear portion of the lens-shutter housing.

It is often desired to employ various camera accessories for special photographic purposes. These accessories include flash and strobe-light equipment; special lenses for close-ups, telephoto, or wide-angle photography; filters for haze or for special effects; and remote-control and time-delay equipment. It is of great convenience to the photographer to be able to attach and detach such auxiliaries quickly, and with a minimum of manipulation. Further, the accessories should be as compact as possible, so as not to overburden the photographer. These requirements acquire even more pronounced importance in relation to cameras which are intended to be specially compact so that they can be carried in pocket or purse, rather than in bulky and cumbersome shoulder cases.

But the very compactness of such cameras poses obstacles to the convenience of attaching accessories, and of making necessary electrical and mechanical connections. The necessarily small lens-shutter housing is already rather crowded by the elements which must be mounted on it, and which must have open access; these include the objective lens, a photocell and manual knobs for controlling the camera settings, an actuator or shutter button, and sockets for flash or strobe lights and for remote-control or time-delay cables. The difficulty is therefore to mount and connect any desired accessories without obscuring or blocking any of the elements of the camera proper.

The general object of the present invention is to afford photographers convenient, easily and quickly mountable and demountable means for attaching accessories in operative relation to cameras. Further objects and advantages of the invention will become apparent as the following description proceeds.

BRIEF DESCRIPTION OF THE DRAWINGS

While the specification concludes with claims particularly pointing out the subject matter which is regarded as the invention, it is believed that a clearer understanding may be gained from the following detailed description of preferred embodiments of the invention, referring to the accompanying drawings, in which:

DESCRIPTION OF THE PREFERRED EMBODIMENTS

Figure 1:
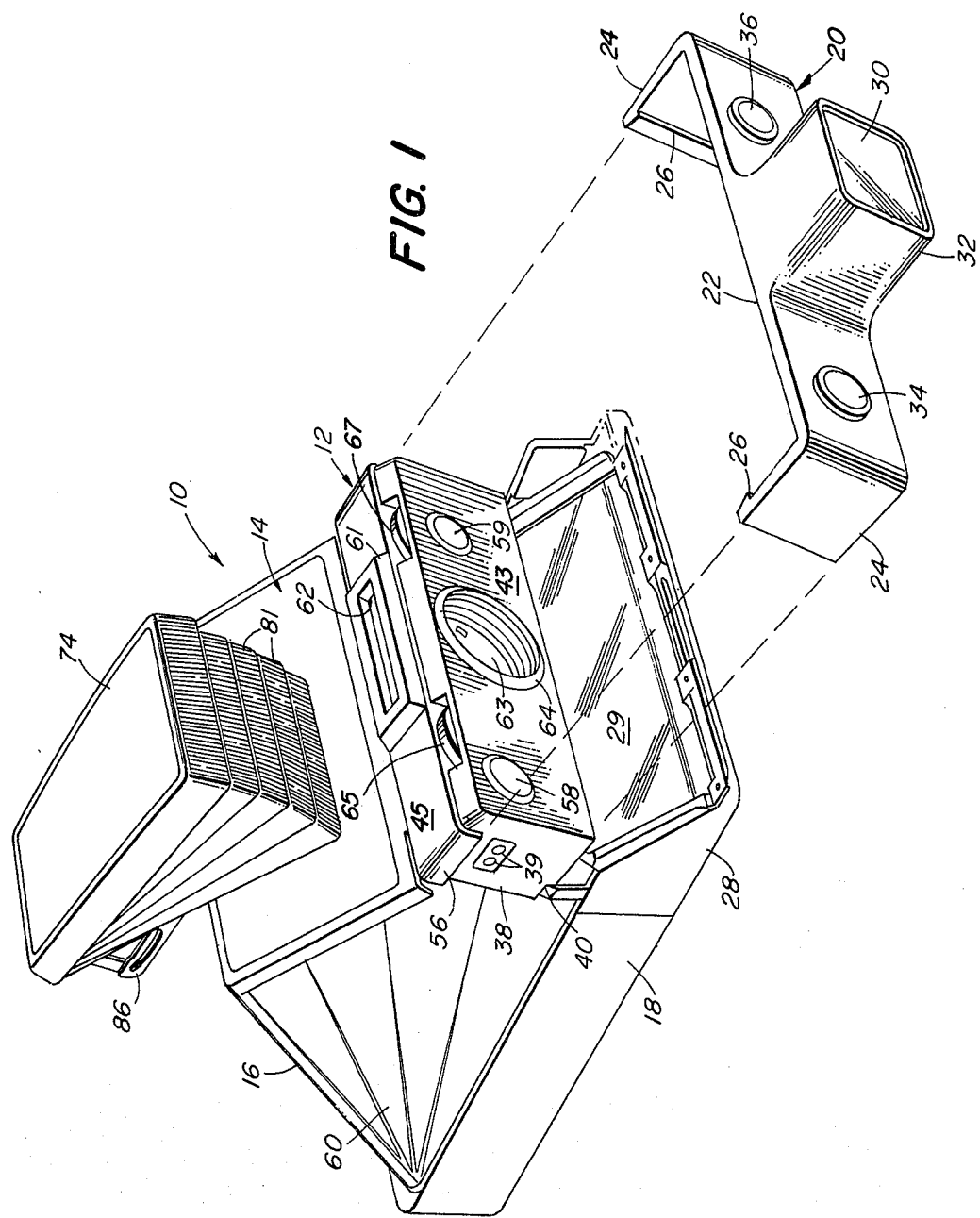
FIG. 1 is a perspective view of a first embodiment of the improved accessory attachment, shown detached from an illustrative camera with which it is especially adapted for use.
Figure 2:
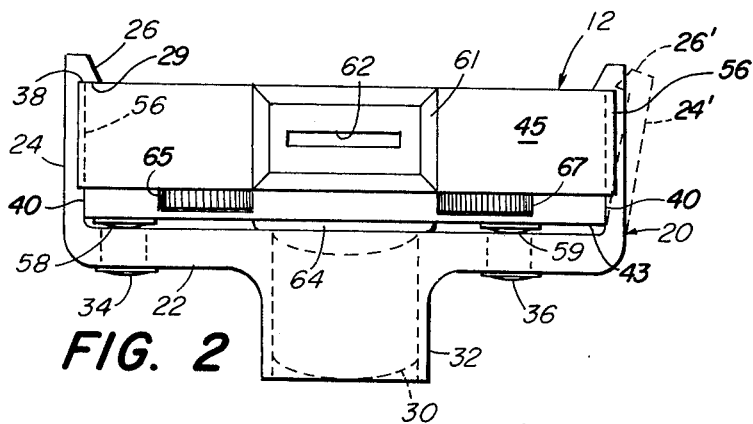
FIG. 2 is a plan view of the attachment of FIG. 1, shown in assembled relation with the lens-shutter housing of the camera.

Referring to FIGS. 1 and 2, a camera is generally indicated at 10, which is of a general type suitable for use with the improved accessory attachment. The illustrated camera is collapsible, as described more fully in the aforementioned U.S. Pat. Nos. 3,714,789 and 3,810,211, but is shown in its extended operative condition. It includes a series of housing members 14, 16, 18 and a lens-shutter housing 12, which are pivotally connected to form a collapsible four-bar linkage so that the camera may be folded into a flat, compact form. An additional housing member 28 is hinged to the housing member 18, and normally latched in the position shown. When unlatched, the housing member 28 can be swung down to open an entry slot for insertion of a film magazine (not shown) into the camera; this slot is normally closed by a pivoted, resiliently biased light-shielding plate member 29 carried on the housing member 28. A light-tight enclosure for receiving the film magazine is defined by the aforementioned housing members and by a collapsible bellows 60. The housing member 14 supports a collapsible viewing device 74 which includes telescoping blades 80, and a linkage 86 to erect a mirror and lens system (not shown) when the camera is opened, to allow reflex viewing through an objective lens 63 of any scene to be photographed.

The lens-shutter housing 12 is generally parallelepiped in form, having a front wall 43, rearwardly-extending side walls 40 terminating in rear corner portions 38, and a top wall 45. The latter extends into laterally-projecting locating flanges 56, whose edges extend rearwardly, normal to the front wall 43. The top wall 45 is provided with a flash unit support pedestal 61, in which a socket 62 is formed to receive a connecting plug of a flash unit (not shown) of a type fully described by U.S. Pat. No. 3,759,153, owned by the assignee of this application. One of the side walls 40 is formed with sockets 39 for the connection of a suitable cable (not shown) for remote-control operation of the camera.

The housing 12 encloses a suitable shutter mechanism (not shown). An objective lens 63 is centrally mounted in the front wall 63, and surrounded by a bezel 64. To its left is located a transparent lens 59 for admitting incident light from any scene viewed by the objective lens to a photocell (not shown) for controlling the photographic functions of the camera in a known manner. A camera cycle start button 58, commonly referred to as a shutter button, is set to the right of the objective lens. The upper edge of the front wall is formed with recesses to accommodate a manual lens-focusing knob 65, and a manual light/dark control knob 67 which adjusts the relationship between the camera settings and the controlling photocell responses in a known fashion.

It will be apparent that the crowded condition of a compact lens-shutter housing resulting from the necessary presence of all these elements, combined with the requirement not to obscure or render any of them inaccessible, poses a material obstacle to convenient attachment of camera accessories such as auxiliary lenses, flash equipment, and the like.

According to the present invention, an accessory attachment comprises a housing 20 formed with a front portion 22 for mounting a camera accessory, illustrated as an auxiliary lens 30 received in a protruding socket 32, and with a pair of side wing portions 24 extending rearwardly. The wing portions are spaced apart to slidably receive the side walls 40 of the lens-shutter housing 12 snugly between them. In the assembled relation of the attachment on the camera as shown in FIG. 2, the auxiliary lens 30 is aligned with the focal axis of the objective lens 63. A transparent lens 36 is mounted in the front portion 22 to admit incident light through the attachment to the photocell 59, and a reciprocably-mounted auxiliary shutter button 34 permits operation of the camera cycle start button 58 when the attachment is in place.

Correct vertical alignment of the auxiliary lenses 30 and 36 and the auxiliary shutter button 34 with their camera counterparts is insured by the locating flanges 56, against whose lower edges the wing portions 24 laterally abut. These edges extend rearwardly normal to the front wall 43 of the lens-shutter housing.

The rearward ends of the wing portions 24 are formed with a pair of opposed latch portions 26, having inner cam surfaces extending forwardly in mutually-converging relation and terminating in recesses 29. In the assembled relation of the attachment 20 with the camera 10, these recesses receive and grip the rear corner portions 38 of the lens-shutter housing 12. The attachment is formed of a resiliently flexible material, such as plastic, so that the wing portions 24 may be manually deflected and separated to distorted positions, one wing being so shown at 24' in FIG. 2, in which the latch portions 26 clear the side walls 40 and the attachment may be pulled forwardly to detach it from the camera.

The cam surfaces of the latch portions 26 are engaged with the side walls 40 and are deflected outwardly thereby enough so that the attachment may be assembled with the camera simply by aligning the cam surfaces with the side edges of the front wall 43, and under the flanges 56, and pressing the attachment rearwardly against the camera. The cam surfaces engage the side walls 40 as the attachment slides rearwardly, until the front portion 22 abuts the front wall 43, and the latch portions 26 engage behind the rear corner portions 38.

The construction of FIGS. 1 and 2 is subject to the criticism that, in removing the attachment from the camera, it is doubtless somewhat awkward to grip and separate both of the latch portions 26 with one hand while holding the camera in the other, or alternatively to grip and spread the latch portions with both hands while resting the camera on a surface.

This objection is overcome by the embodiments of FIGS. 3 through 7, in which latch-actuating levers permit the accessory to be removed simply by grasping these levers conveniently in one hand and the camera in the other, and pulling the attachment from the camera.

Figure 3:
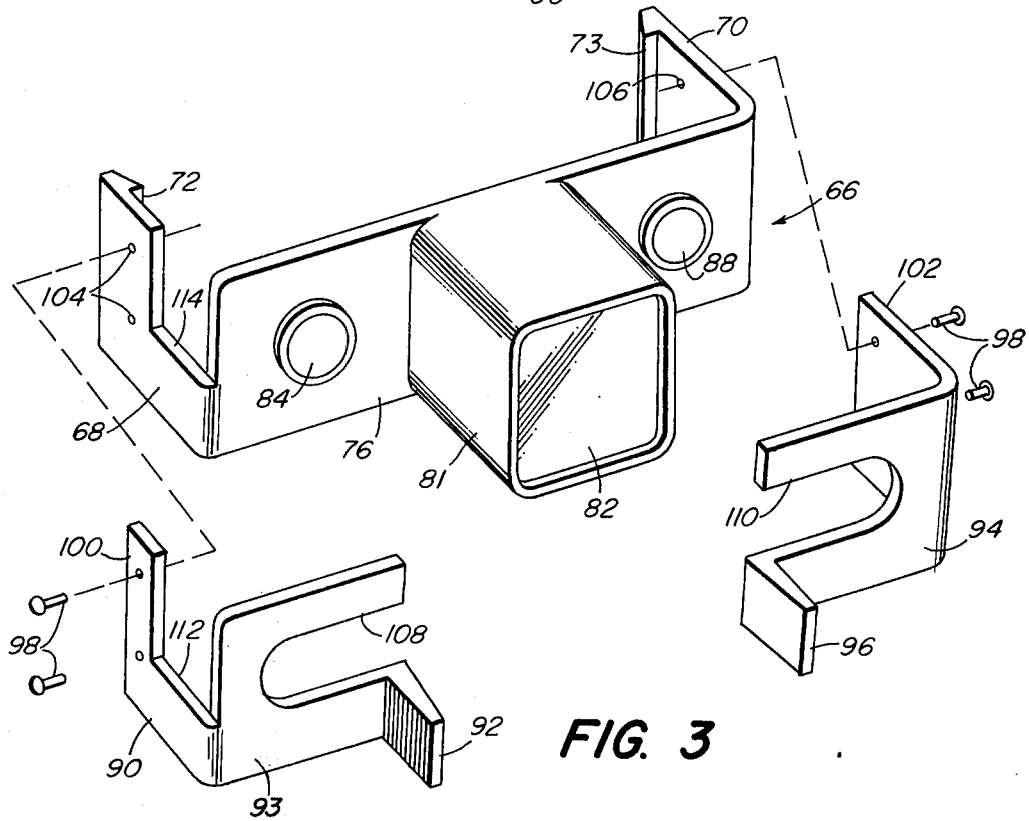
FIG. 3 is an exploded view in perspective of another form of the improved accessory attachment.
Figure 4:
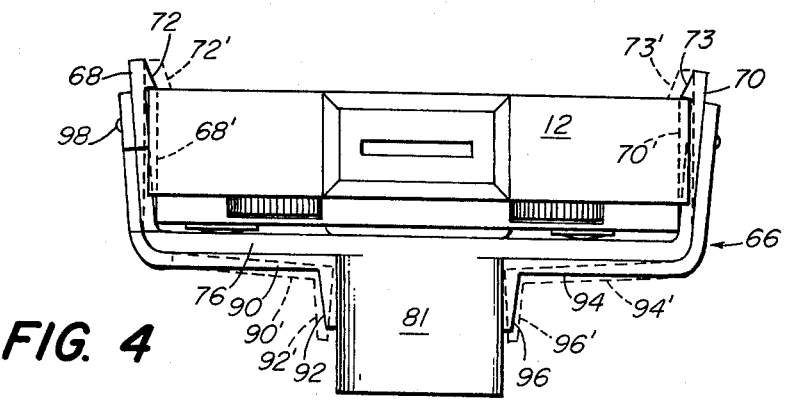
FIG. 4 is a plan view of the attachment of FIG. 3, shown in assembled relation with the lens-shutter housing of a camera like that of FIG. 1.

Referring to FIGS. 3 and 4, one such attachment 66 has a pair of actuator levers 90, 94, each of generally Z-shaped configuration in plan view. First legs 100, 102 are secured firmly to wing portions 68, 70 of the attachment by means of rivets 98 or other fasteners, received through holes 104, 106 in the wing portions. The first legs extend forwardly from their points of attachment along the corresponding wing portions, and join second legs 93, 94 forwardly of the front portion 76 of the attachment. The second legs extend toward one another across the front portion, and terminate just short of a socket 81, which houses an auxiliary lens 82. Thence, each lever extends into a corresponding grip portion 92 or 96 which protrudes forwardly.

In a relaxed condition of the attachment, the second legs of the levers 90, 94 diverge slightly from the edges toward the center of the front portion 76, and the grip portions 92 and 96 are slightly spaced apart from the sides of the lens socket 81, as indicated in dotted lines at 90', 94' and 92', 96'. The wing portions 68, 70 terminate rearwardly in latch portions 72, 73, which engage the rear corner portions of the lens-shutter housing 12 in the relaxed condition of the attachment, as shown at 68', 70', and 72', 73', to secure it firmly to the camera.

The attachment is formed of a resilient, flexible material such as plastic. To remove the attachment from the camera, it is only necessary to engage the grip portions with thumb and finger, pressing them together to the solid-line positions 92, 96 against the sides of the socket 81, and to pull the attachment forwardly from the camera. Depression of the grip portions applies bending moments to the wing portions which deflects them and the latch portions to the solid-line positions 68, 70 and 72, 73, respectively, in which the latch portions are spread apart to clear the side walls of the lens-shutter housing 12. During re-assembly, the side walls engage the latch portions 72, 73 and deflect them outwardly enough so that they may slide freely to the attached position shown in FIG. 4.

To provide access to an auxiliary shutter button 84, a photocell opening or lens 88, and cable sockets such as that shown at 39 in the camera of FIG. 1, the lever 90 has recesses 108 and 112, the wing portion 68 has a recess 114 matching the recess 112, and the lever 94 has a recess 110.

Figure 5:
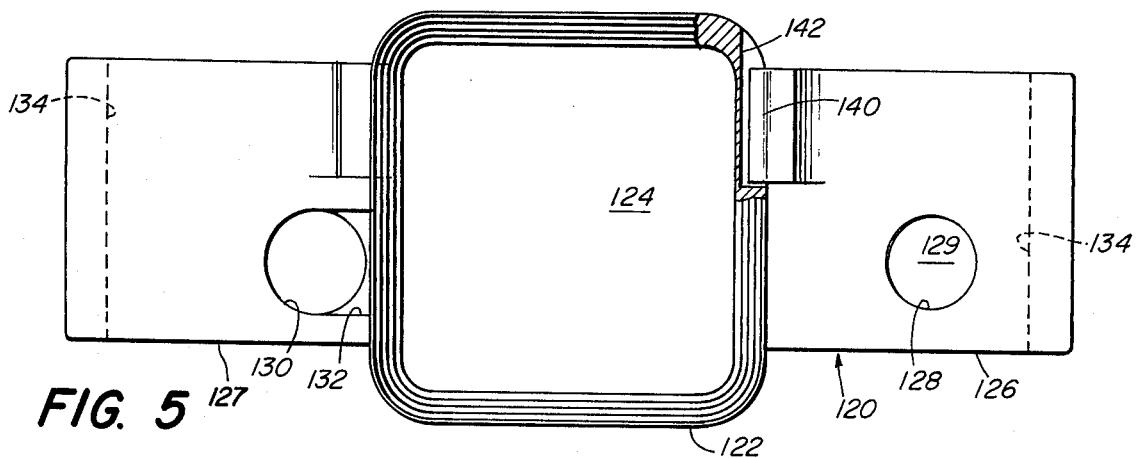
FIG. 5 is a view in front elevation of another embodiment of the accessory attachment.
Figure 6:
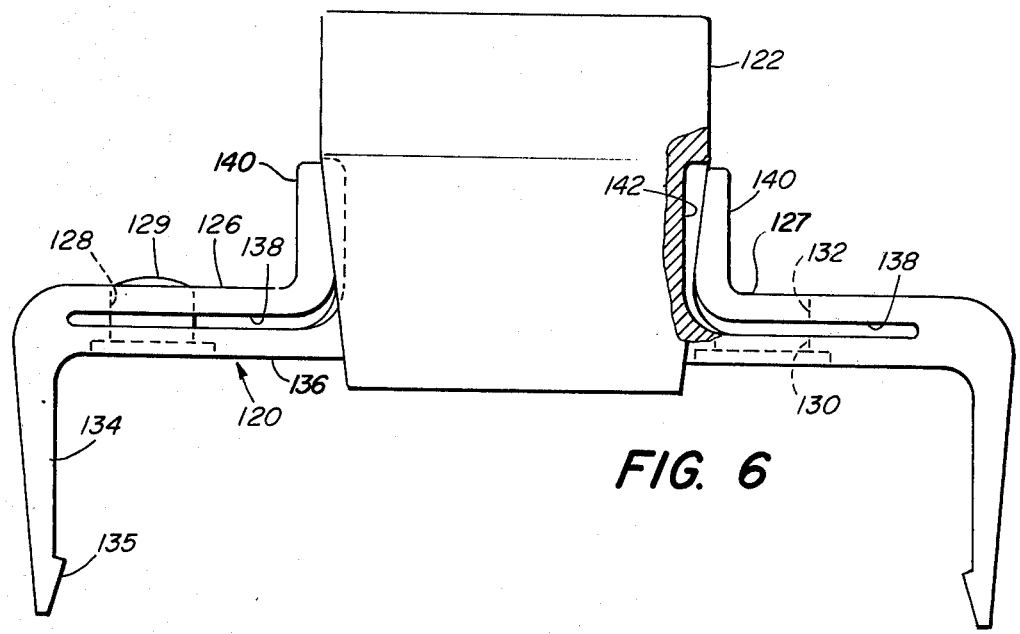
FIG. 6 is a plan view of the attachment of FIG. 5.

A modified attachment 120 shown in FIGS. 5 and 6 functions similarly to that of FIGS. 3 and 4, but has actuating levers 126, 127 which are molded integrally into the body of the attachment, joining it at the junctions of the wing portions 134 with the front portion 136. Elongated slots 138 extend through the attachment from top to bottom, so that forwardly-protruding grip portions 140 are secured to the body of the attachment 120 only by cantilever connections through the outboard ends of the levers 126, 127. The socket 122 mounts an auxiliary lens 124, and has recesses 142 in its sides, underlying and normally spaced apart from the grip portions 140. By squeezing the grip portions into these recesses, bending moments are applied which deflect the wing portions 134 outwardly to separate latch portions 135 formed in their rearward ends, so that the attachment may conveniently be removed from the camera, as in the preceding embodiment.

A photocell window 130 formed in the front portion 136, and an auxiliary shutter button 129 received slidably in the other, are provided exterior access through a recess 132 in the lever 127, and a hole 128 in the lever 126, respectively.

Figure 7:
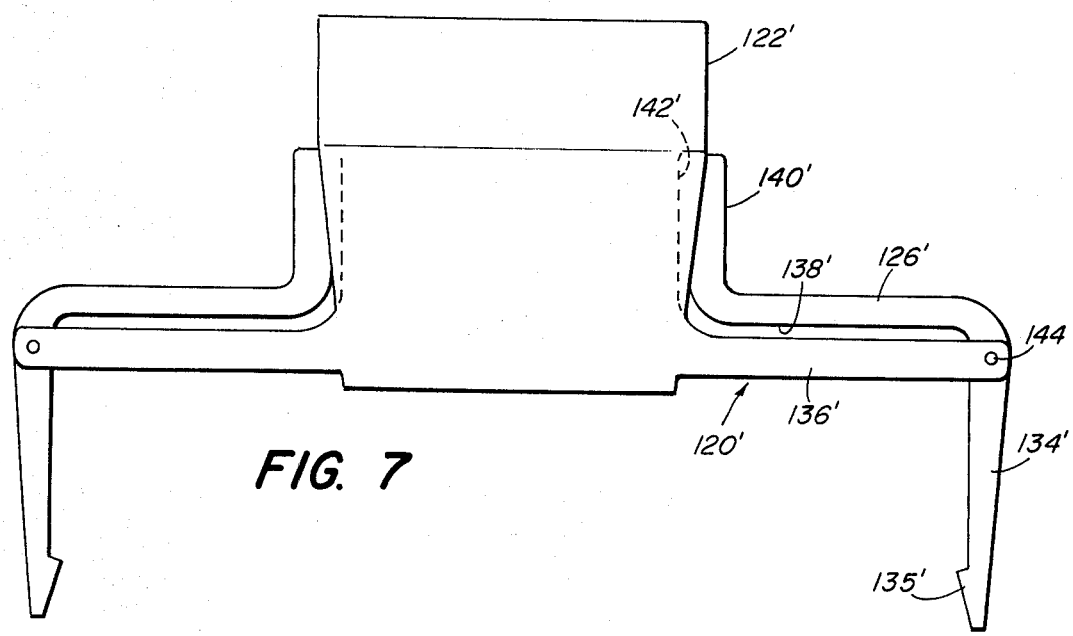
FIG. 7 is a plan view showing a further modification.

A further modification in an attachment 120' is shown in FIG. 7, in which Z-shaped actuating levers 126' are formed separately from an auxiliary lens socket 122' into which the front portion 136' is integrally molded, and the parts are pivotally connected as at 144. Gaps 138' normally separate the levers from the front portion 136', and the grip portions 140' from recesses 142' in the sides of the socket 122'. Suitable helical torsion springs (not shown) may be mounted coaxially with the pivots 144, or other spring biasing means may be employed, to bias the levers in angular directions which bring the latch portions 135' of the wing portions 134' toward one another, so that they will grip the camera's lens-shutter housing securely in a relaxed state of the attachment. Disassembly is carried out as before, by pressing the grip portions 140' together to separate the latch portions 135'.

It should be understood that the improved attachment may be used to mount accessories other than the auxiliary lenses which have been illustrated. For example, an electronic strobe or flash unit may be mounted on the attachment, projecting above or to either side of the lens-shutter housing.

What is claimed is:

1. An accessory attachment for use with a camera having a lens-shutter housing formed with a front wall mounting a lens, and with side walls extending rearwardly from said front wall and terminating in rear corner portions, said accessory attachment comprising:
a camera accessory device and an accessory housing mounting said accessory device therein, said accessory housing including an accessory-mounting front portion and a pair of side wing portions extending rearwardly from said front portion and spaced apart to receive said lens-shutter housing therebetween, said wing portions comprising a pair of actuator levers, means pivotally mounting said actuator levers on said accessory housing, and a pair of opposed latch portions formed on said actuator levers and constructed and arranged to releasably engage said rear corner portions to secure said accessory attachment on said lens-shutter housing.

2. An accessory attachment as recited in claim 1, said latch portions being relatively movable for manual deflection thereof to engage and disengage said latch portions with said rear corner portions.

3. An accessory attachment as recited in claim 2, said wing portions being resiliently flexible and incorporating said latch portions.

4. An accessory attachment for use with a camera having a lens-shutter housing formed with a front wall mounting a lens, and with side walls extending rearwardly from said front wall and terminating in rear corner portions, said accessory attachment comprising:
a camera accessory device and an accessory housing mounting said accessory device therein, said accessory housing including an accessory-mounting front portion and a pair of side wing portions extending rearwardly from said front portion and spaced apart to receive said lens-shutter housing therebetween, said wing portions bearing a pair of opposed latch portions constructed and arranged to releasably engage said rear corner portions to secure said accessory attachment on said lens-shutter housing, said latch portions being relatively movable for manual deflection thereof to engage and disengage said latch portions with said rear corner portions, said wing portions being resiliently flexible and incorporating said latch portions, and a pair of actuator levers connected to said wing portions and extending therefrom into grip portions located forwardly of said front portion, said actuator levers being constructed and arranged to flex said wing portions to spread said latch portions apart to clear said rear corner portions when said grip portions are pressed toward one another.

5. An accessory attachment for use with a camera having a lens-shutter housing formed with a front wall mounting a lens, and with side walls extending rearwardly from said front wall and terminating in rear corner portions, said accessory attachment comprising:
a camera accessory device and an accessory housing mounting said accessory device therein, said accessory housing including an accessory-mounting front portion and a pair of side wing portions extending rearwardly from said front portion and spaced apart to receive said lens-shutter housing therebetween, said wing portions bearing a pair of opposed latch portions constructed and arranged to releasably engage said rear corner portions to secure said accessory attachment on said lens-shutter housing, said latch portions being relatively movable for manual deflection thereof to engage and disengage said latch portions with said rear corner portions, and a pair of actuator levers connected with said latch portions and constructed and arranged for manual deflection thereof, each of said actuator levers being substantially Z-shaped, and having a first leg extending forwardly, from a point of connection thereof to a corresponding one of said wing portions, along a corresponding one of said wing portions, a second leg extending laterally partially across said front portion, and a said grip portion extending forwardly from said front portion; the grip portions of said pair of actuator levers extending in substantially parallel spaced-apart relation forwardly from said front portion.

6. An accessory attachment as recited in claim 5, said accessory device comprising a lens holder formed through said front portion, said grip portions being located laterally adjacent to opposite sides of said lens holder.

7. An accessory attachment as recited in claim 6, said accessory device further comprising at least one camera function-controlling device mounted in said front portion, said actuator levers being formed and located to provide frontal access to said function-controlling device.

* * * * *